April 25, 1933.  W. COOPER ET AL  1,905,441
NONSKID DEVICE
Filed Nov. 4, 1932
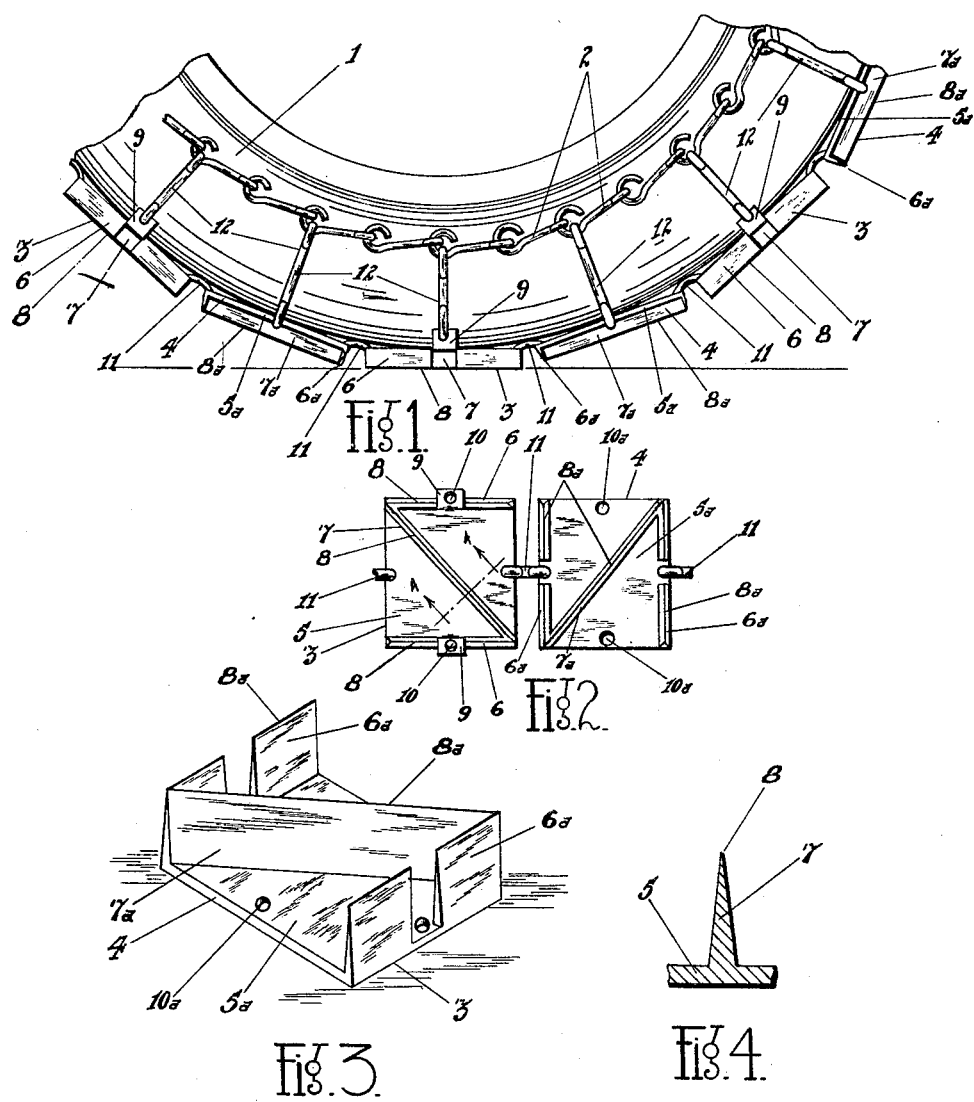
INVENTORS.
WILLIAM COOPER.
WILLIAM F. KNAPP.
BY Philip S. Hopkins
ATTORNEY.

Patented Apr. 25, 1933

1,905,441

UNITED STATES PATENT OFFICE

WILLIAM COOPER AND WILLIAM F. KNAPP, OF APALACHIN, NEW YORK

NONSKID DEVICE

Application filed November 4, 1932. Serial No. 641,210.

Our invention relates to a non-skid device for vehicle wheels and has special reference to a removable traction tread for automobile tires.

The primary object of our invention is to provide a practical and efficient anti-skid or traction element which may be readily applied around the tire casing of a vehicle wheel and which will be so constructed as to effectually prevent side slipping of the wheel while, at the same time, affording efficient traction for the wheel and thereby preventing said wheel from spinning when power is applied thereto.

Another object of our invention lies in the provision of a plurality of connected traction elements and wherein each of said elements will be provided with flanges designed to prevent spinning of the wheel and with other flanges designed to prevent side slipping of said wheel.

Still another object of our invention lies in the provision of a reenforcing means in the form of a substantially rigid diagonal rib on said traction elements, preventing distortion of the flange members thereon. It also provides a rigid tread base when said element is in its lowermost position, thereby eliminating the unpleasant rattle and noise heretofore experienced.

Other objects and advantages in details of construction will be apparent as the description proceeds, reference now being had to the figures of the accompanying drawing forming a part of this application and wherein like reference numerals indicate like parts.

In the drawing:

Figure 1 is a side elevation of a fragmental portion of a pneumatic tire having applied thereto our anti-skid tread members.

Figure 2 is a plan view of the tread members.

Figure 3 is a perspective view of one of said treads.

Figure 4 is a detail cross sectional view taken on the line 4—4 of Figure 2.

The reference character 1 refers to a pneumatic tire which may be of the ordinary conventional type for mounting upon automobile wheels.

Suitably mounted so as to be preferably rigid with the tire casing, on each side thereof, is an endless chain member 2. Spaced on the outer periphery of the tire casing 1 are the tread members 3 and 4 and secured thereon by means of the cross links 12 which connect to the endless chain member 2 on each side of said tire casing. It will be understood also that the tread members can be secured in position on the tire with any other suitable attaching means.

It will be noted with particular reference to Figure 2 that the tread members 3 and 4 differ somewhat in details of construction, whereby said construction prevents the wheel from slipping both longitudinally and transversely. This construction consists of a channeled metal frame having a bottom 5 provided with outwardly extending traction flanges 6, which preferably extend the full length of the bottom 5 on the tread member 3. Disposed in a diagonal relationship to said flanges is a rib member 7 connecting the inner and opposite ends of the flange members 6 and thereby providing a rigid supporting member for said flanges and at the same time providing a suitable tread base. It will also be noted that the upper edges of said flange members are beveled as at 8 (see Figure 4) and thereby providing a positive firm engagement with the ground.

Struck from the center portion of the flange members 6 and bent downwardly therefrom are lug members 9 with suitable openings 10 for engagement with the cross links 12 by which the tread member is attached to the links of the side chains 2.

Suitably connected to each member 3, as by means of the links 11, is a tread member 4. It will be noted with particular reference to Figure 2 that the flange members 6a of this member are disposed at right angles to the flanges 6 on the tread member 3. Obviously therefore, we have provided a positive means for preventing spinning of the wheel circumferentially, as well as the flange members 6 providing the necessary means for preventing side slipping of the wheel.

The diagonal rib 7a projecting from the bottom 5a and connecting the inner and opposite ends of flanges 6a is oppositely disposed from that of the rib 7. The beveled edges 8a on the flanges 6a and 7a are of the same construction as shown on the tread member 3.

Disposed substantially centrally at the edges of the bottom 5a are openings 10a for the reception of the cross links 5 and thereby securing said tread member to the links of the endless chain member 2.

It will be noted with reference to Figures 1 and 2 that by alternating the tread members 3 and 4 as shown, we have provided a novel anti-skid device in conjunction with eliminating certain rattling noises by means of the diagonal rib members 7 and 7a.

From the foregoing description it will be clear that we have provided an effective device for the purpose set forth while at the same time, the device is characterized by structural simplicity. In order that wheels and tire casings of different sizes may be fitted with the device, the dimensions of the traction elements may, of course, be varied as well as the length of the securing chains therefor.

Of course, changes may be made in details of construction and arrangement of parts without departing form the spirit and scope of our invention. We do not limit ourselves therefore, to the exact form herein shown and described other than by the appended claims.

We claim:

1. A non-skid device for tires comprising a plurality of tread elements arranged in end to end relation, each of said elements comprising a base having upstanding flanges on two parallel sides, each of said elements having its flanges disposed at right angles to the flanges of the adjacent element, and each of said elements having a diagonally extending rib substantially the same height of said flanges.

2. A non-skid device for tires comprising a plurality of tread elements arranged in end to end relation, each of said elements comprising a base having upstanding flanges on two parallel sides, each of said elements having its flanges disposed at right angles to the flanges of the adjacent element, and each of said elements having a diagonally extending rib substantially the same height of said flanges, said ribs extending alternately in opposite directions.

In testimony whereof, we affix our signatures.

WILLIAM COOPER.
WILLIAM F. KNAPP.